United States Patent [19]

Rozek

[11] Patent Number: 5,092,224
[45] Date of Patent: Mar. 3, 1992

[54] CONICAL ROD PISTON

[75] Inventor: Roy J. Rozek, Plymouth, Wis.

[73] Assignee: Thomas Industries, Sheboygan, Wis.

[21] Appl. No.: 470,805

[22] Filed: Jan. 26, 1990

[51] Int. Cl.⁵ .......................... F01B 31/00; F16J 1/04
[52] U.S. Cl. ......................................... 92/109; 92/99; 92/209; 92/248
[58] Field of Search ................ 92/98 R, 99, 109, 172, 92/191, 209, 248; 417/413, 415

[56] References Cited

U.S. PATENT DOCUMENTS

| | | | |
|---|---|---|---|
| 76,448 | 4/1868 | Hinds et al. | 92/191 X |
| 242,366 | 5/1881 | Preston | 92/206 |
| 551,366 | 12/1895 | Cornwall | 92/172 X |
| 1,254,345 | 1/1918 | Nowosielski | 92/191 X |
| 1,281,196 | 10/1918 | Norrbom | 92/191 X |
| 1,433,987 | 10/1922 | Deibert | 92/189 |
| 1,449,034 | 3/1923 | Calaway | 92/191 |
| 1,681,494 | 8/1928 | Noble | 92/172 X |
| 1,748,612 | 2/1930 | Muhlfeld | 92/172 |
| 1,789,089 | 1/1931 | Tobler | 92/189 |
| 1,801,517 | 4/1931 | Matthews | 92/189 |
| 2,388,781 | 11/1945 | Dailey | 92/172 X |
| 2,640,432 | 6/1953 | Chappelle | 92/172 X |
| 2,694,383 | 11/1954 | Larcen | 92/172 X |
| 2,765,776 | 10/1956 | Pyk | 92/172 X |
| 3,250,225 | 5/1966 | Taplin | 92/80 X |
| 3,469,504 | 9/1969 | Neighorn | 92/172 X |
| 3,695,150 | 10/1972 | Salzmann | 92/172 X |
| 4,454,802 | 6/1984 | Cailliau et al. | 92/172 X |
| 4,483,143 | 11/1984 | Corey | 92/172 X |
| 4,993,925 | 2/1991 | Becker et al. | 92/99 X |
| 5,022,313 | 6/1991 | Shontz et al. | 92/248 |

FOREIGN PATENT DOCUMENTS 2916847  4/1980  Fed. Rep. of Germany ........ 92/172

Primary Examiner—Edward K. Look
Assistant Examiner—John Ryznic
Attorney, Agent, or Firm—Hill, Van Santen, Steadman & Simpson

[57] ABSTRACT

An improved wobble-type piston and rod assembly wherein the assembly includes a conical or infundibularly shaped piston that is capable of withstanding non-axial stress and strain forces induced by reciprocation of the crank shaft ring. An apex of the infundibularly shaped piston is attached to the ring. The piston can be attached to the crank shaft ring by means of a plurality of axial ribs, the ribs flaring outwardly from the apex of the piston to the ring. Alternatively, the piston can be attached to the ring by means of a flattened beam with two ribs/fins that flare outwardly within the plane of the beam. The piston rod assembly is formed as a unitary body.

12 Claims, 1 Drawing Sheet

CONICAL ROD PISTON

BACKGROUND OF THE INVENTION

The present invention generally relates to pistons. More specifically, the invention relates to wobble-type piston and rod assemblies wherein the piston is statically fixed to the piston rod.

Wobble-type piston and rod assemblies are old and well-known in the art. These assemblies are extensively employed in air compressors and diaphragm pumps.

One problem associated with such assemblies is the distribution of stress and strain forces along the connection between the piston and the rod. The rod and piston generally are connected together at a joint having T-shaped cross sections. As the rod reciprocates, it exerts angular stresses at the joint and may cause weakening of the joint, and unacceptable flexing of the assembled parts.

SUMMARY OF THE INVENTION

The present invention provides an improved wobble-type piston and rod assembly. The assembly includes a conical or infundibularly shaped piston that is capable of withstanding non-axial stress and strain forces induced by reciprocation of the crank shaft ring.

To these ends, in an embodiment, the invention provides a crank shaft ring and a substantially conically or infundibularly shaped piston, an apex of which is attached to the ring.

In another embodiment, the invention provides an infundibularly or conically-shaped piston attached to a crank shaft ring by means of a piston rod formed as a plurality of axial ribs, the ribs flaring outwardly from the apex of the piston to the ring.

In another embodiment, the invention provides a conically-shaped piston attached to a crank shaft ring by means of a piston rod formed as a flattened beam with two ribs/fins that flare outwardly within the plane of the beam.

An advantage of the invention is an improved wobble-type piston and rod assembly that is better able to withstand non-axial stresses and strains exerted at the joint joining the piston to the assembly.

Another advantage of the invention is the provision of a unitary wobble-type piston and rod assembly that is easily formable as a unitary body.

These and other advantages and embodiments will become more apparent below in the detailed description of the presently preferred embodiments and accompanying drawings.

DETAILED DESCRIPTION OF THE PRESENTLY PREFERRED EMBODIMENTS

For the purposes of this description for the appended claims, it is to be understood that the term conical, when used with reference to a piston, includes both solid conical shapes as well as infundibular or frusto-conical shapes unless specifically stated otherwise. It can be appreciated that an infundibular shape is preferred because of its lesser weight and/or mass.

Figure 1:
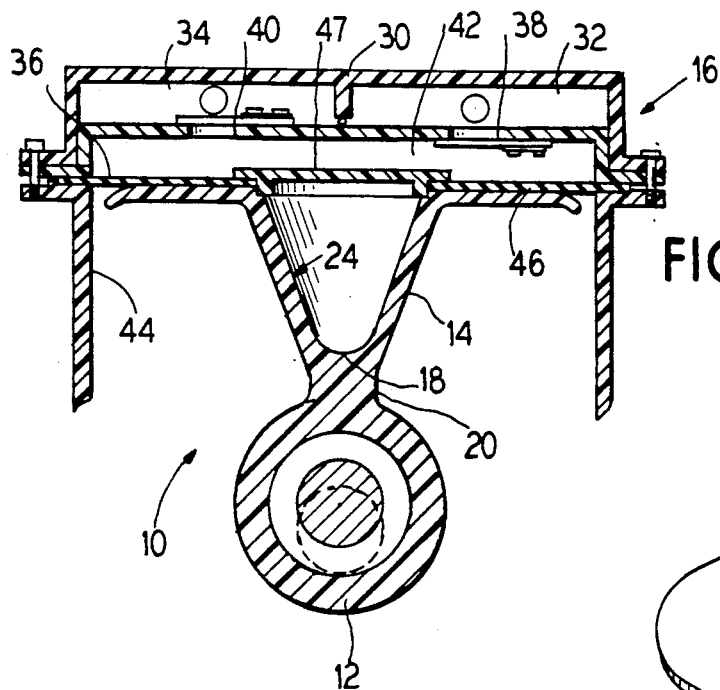
FIG. 1 is a cross-sectional view of an infundibular piston and rod assembly embodying principles of the invention.
Figure 2:
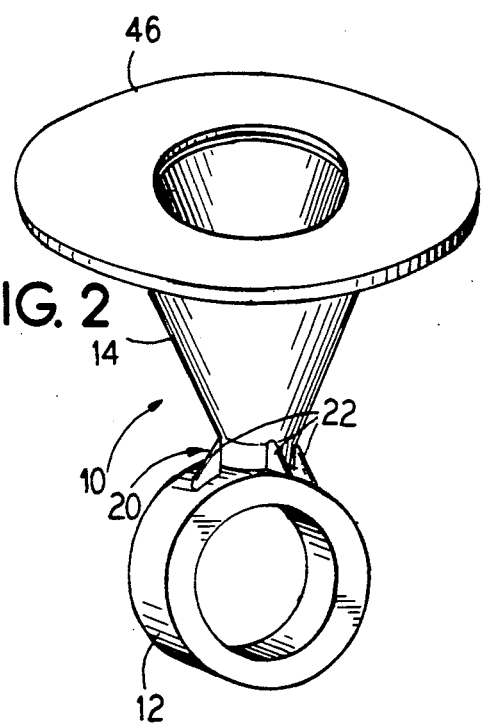
FIG. 2 is a perspective view of a modified version of the infundibular piston and rod assembly of FIG. 1.

A piston and rod assembly 10 embodying principles of the invention is illustrated in FIGS. 1 and 2. The assembly 10 includes a crank shaft ring 12 and a conical combined piston and piston rod 14. In FIG. 1, the assembly 10 is illustrated in conjunction with a diaphragm pump 16.

As illustrated in cross-section in FIG. 1, the conically shaped piston 14 has a V-shape and the apex 18 is joined to the crank shaft ring 12 by means of a joint 20. The point at which the joint 20 meets the apex can also be considered a waist section. The joint 20 comprises a relatively thicker region that may, as illustrated in modified version in FIG. 2, or may not include reinforcing ribs 22. In either event, the joint 20 has a substantially conical profile that flares outwardly from the apex to the ring 12.

As illustrated in FIG. 1, the piston rod assembly 10 is adapted for use in a diaphragm pump 16 that includes a manifold 30 having intake and output chamber 32 and 34, respectively. A diaphragm 36 is positioned below reed valve openings 38 and 40 to create a pumping chamber 42. The diaphragm 36 is appropriately attached to a cylinder 44 so as to seal the pumping chamber 42.

The piston 14 includes a radial flange 46 that provides support to the underside of the diaphragm 36. It can be appreciated that reciprocation of the piston will cause flexing of the diaphragm 36 which in turn provides the requisite pumping action.

The diaphragm 36 is secured to piston 14 by means of a retainer plate 47. This plate may be secured to piston 14 by means of ultrasonic welding or other conventional means, i.e., threaded, screwed, bonded, etc.

It can also be appreciated that because the piston 14 is a wobble type piston and does not reciprocate along a linear path, as the piston 14 is caused to reciprocate, stress and strain forces are exerted at angles to the axis of the conical piston 14 as well as along the axis of the cone. These forces vary as the piston 14 is caused to tilt back and forth as it reciprocates in wobble fashion.

Due to the conical shape of the piston 14, the wall 24 of the piston 14 is capable of reacting to the angular forces. The slope of the wall 24 aligns the wall 24 with some of these angular forces.

Figure 3:
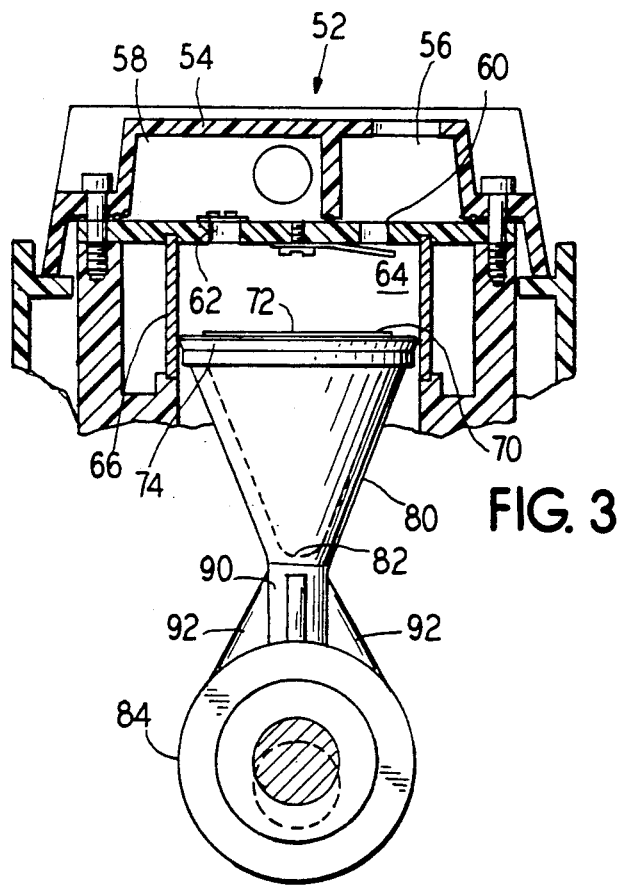
FIG. 3 is a cross-sectional view of a conical rod and piston assembly embodying further principles of the invention.

In FIG. 3, there is illustrated another piston and rod assembly 50 that is constructed in accordance with the invention. The assembly 50 is shown employed in a typical air compressor 52.

The air compressor 52 includes a manifold 54 having an air inlet chamber 56 and an air outlet chamber 58. Reed valve openings 60 and 62 provide fluid communication between these chambers and a compression chamber 64. A cylinder 66 attached to a base 68 of the manifold 52 provides the compression chamber 64.

A piston head 70 of the assembly 50 is received within the cylinder 66. The piston head 70 is typical of most wobble-type pistons in that it includes a working surface 72 and a cup seal 74 about the periphery of the working surface 72.

As illustrated, a piston 80 of the assembly 50 is conically shaped and has its apex 82 attached to a crank ring 84. In contrast to the assembly 10, in the assembly 50, the conical piston 80 is attached to the ring 84 by means of a flattened beam 90 that serve as a piston rod. The flattened beam includes two flared ribs 92 that flare outwardly within the plane of the beam 90.

As the piston and rod assembly 50 is caused to reciprocate, the stresses and strains exerted on the joint between the piston 80 and the flattened beam 90 with flared ribs 92 are exerted along the ribs and the wall of the piston 80 at an angle to the axis of the piston. This angular exertion of forces is less stressful on the joint than if the point were T-shaped in cross-section and therefore, the joint is less likely to fail.

It can be appreciated that in all of the illustrated embodiments, the joint or waist section in cross-section defines an X-shape in profile. The outer wall of the piston comprises the upper portion of the X-shape. The outer edges of the flared ribs lying within a plane of the crank shaft ring comprise the lower portion of the X-shape. It is this X-shape that provides triangulated action and counteraction to relieve the joint from failure due to the affects of the stress and strain forces.

While preferred embodiments have been shown, modifications and changes may become apparent to those skilled in the art which shall fall within the spirit and scope of the invention. It is intended that such modifications and changes be covered by the attached claims.

I claim as my invention:

1. A one-piece piston comprising:
a crankshaft end adopted to be connected to a crankshaft, a piston head end remote from the crankshaft end and a piston rod section intermediate said piston head and crankshaft ends, said piston rod section having a first converging section extending outwardly from the crankshaft end and converging to a waist section and a second diverging section extending outwardly from the waist section and diverging outwardly toward said piston head end, said diverging section having substantially a frusto-conical exterior, said diverging section terminating in an out-turned annular lip at its large diameter end, said lip forming the piston head outer diameter, said frusto-conical portion being hollow, said frusto-conical portion having a cap member in its large diameter end closing the hollow interior, said cap member and said lip forming the piston head ends face, said converging section being non-circular in cross-section, the converging section being a flattened beam.

2. The piston of claim 1, wherein the flattened beam has projecting stiffening ribs.

3. The piston of claim 2, wherein the waist is circular having radially extending projection stiffening ribs.

4. A plastic piston assembly, comprising:
(a) a plastic annular crank shaft ring;
(b) a plastic hollow frusto-conical piston body having an apex and a piston head end remote from the apex;
(c) a plastic joint member extending between and joining said apex to said crank shaft ring, the joint member interconnecting an outer wall of the crank shaft ring and the apex of the frusto-conical piston body;
(d) a plastic working surface member secured to the piston head end of the piston body remote from the apex; and
(e) an annular seal secured between the working surface member and the piston head end of the piston body.

5. The piston assembly of claim 4, wherein said piston includes a radially extending annular flange forming a working surface of said piston.

6. The piston assembly of claim 4, wherein said piston includes a working surface closing said frusto-conical piston body at its larger diameter end, ad a cup seal extending about a periphery of said working surface.

7. A unitary piston assembly, comprising:
(a) a crankshaft ring;
(b) a piston formed by an infundibular body having an apex; and
(c) a joint that connects said apex to said ring, at least a portion of said joint flaring outwardly toward said ring, said joint including a plurality of flared ribs positioned about said apex.

8. A unitary piston assembly, comprising:
(a) a crankshaft end;
(b) a piston formed by an infundibular body having an apex; and
(c) a joint that connects said apex to said ring, at least a portion of said joint flaring outwardly toward said ring, said joint including a plurality of flared ribs between said apex and said ring.

9. A diaphragm pump, comprising:
(a) a pump manifold;
(b) a cylinder operatively attached to said manifold;
(c) a diaphragm operatively attached within said cylinder; and
(d) a piston assembly operatively attached to said diaphragm, said piston assembly including a conically shaped piston body having an apex extending in converging fashion from said diaphragm, a crankshaft ring attached to said apex, and a joint extending between said piston body and said ring, said joint extending in diverging fashion from said apex to said ring.

10. The piston assembly of claim 9, wherein said piston includes a radially extending annular flange forming a working surface of said piston.

11. The piston assembly of claim 9, wherein said joint includes a plurality of flared ribs positioned about said apex.

12. The piston of claim 9 wherein said joint includes a plurality of flared ribs extending between said apex and said ring.

* * * * *